United States Patent [19]

Goebel

[11] Patent Number: 4,458,341

[45] Date of Patent: Jul. 3, 1984

[54] METHOD AND APPARATUS FOR SEISMIC EXPLORATION

[76] Inventor: Vaughn S. Goebel, 267 Kimball Ave., Golden, Colo. 80401

[21] Appl. No.: 256,896

[22] Filed: Apr. 23, 1981

[51] Int. Cl.$^3$ .............................................. G01V 1/16
[52] U.S. Cl. ....................................... 367/43; 367/48; 367/58; 367/178
[58] Field of Search ...................... 367/49, 44, 43, 79, 367/78, 75, 80, 77, 58, 72, 178; 370/112; 340/854; 364/200

[56] References Cited

U.S. PATENT DOCUMENTS

| | | | |
|---|---|---|---|
| 3,344,881 | 10/1967 | White | 367/72 X |
| 3,397,754 | 8/1968 | Roden | 367/43 |
| 3,858,168 | 12/1974 | Barr, Jr. et al. | 367/49 |
| 3,872,478 | 3/1975 | Lucole | 367/178 X |
| 3,988,712 | 10/1976 | Ezell et al. | 367/80 |
| 4,189,705 | 2/1980 | Pitts, Jr. | 340/854 |
| 4,296,485 | 10/1981 | Clemens | 367/77 |
| 4,308,598 | 12/1981 | Mahmood | 367/79 |
| 4,320,472 | 3/1982 | Fort | 367/79 |

Primary Examiner—Maynard R. Wilbur
Assistant Examiner—K. R. Kaiser
Attorney, Agent, or Firm—Victor R. Beckman

[57] ABSTRACT

A geophone is disclosed which includes at least two transducers having axes which are perpendicular to each other for sensing vertical and horizontal in-line components of seismic waves. In one arrangement, the geophone includes a signal processor which includes active circuit elements responsive to the transducer output for suppressing ground roll components included in the transducer outputs. At least one of transducer output signals with ground roll signal components suppressed therefrom is connected to a remote location for recording. When more than one signal is to be sent from the geophone to the remote recording location, a mulliplexer is provided at the geophone for transmission of a plurality of geophone output signals to the remote location over a single transmission path, such as a dual-conductor transmission line. Analog and digital versions of the geophone are disclosed.

16 Claims, 10 Drawing Figures

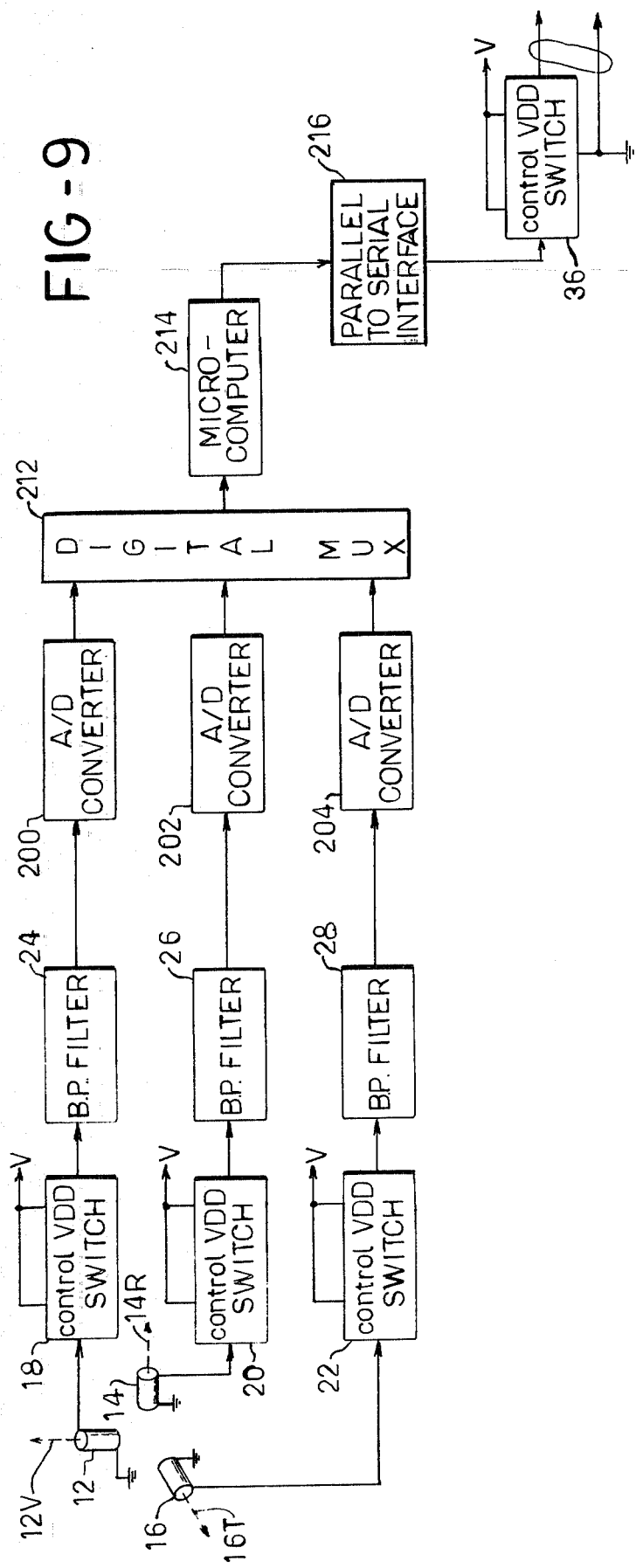
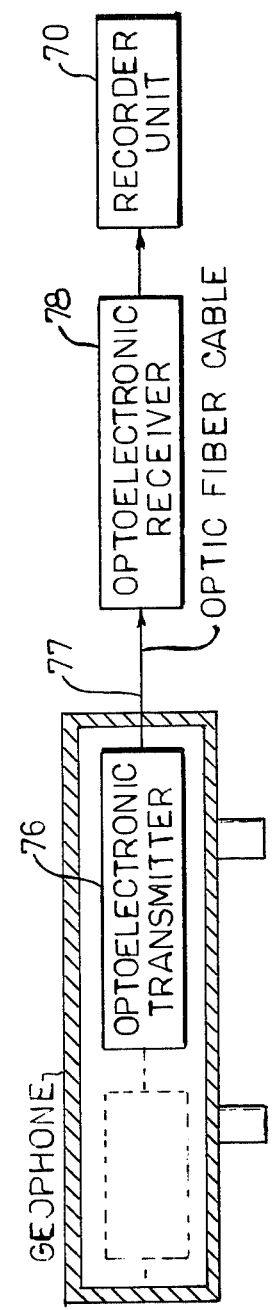

METHOD AND APPARATUS FOR SEISMIC EXPLORATION

BACKGROUND OF THE INVENTION

Seismic exploration involves generating seismic waves at or adjacent the surface of the earth, portions of which waves travel downwardly through the earth and are reflected from interfaces back to the earth's surface. Geophones sense the reflected waves at points spaced from the seismic source. Generally, each geophone includes a single motion-sensing transducer responsive only to the vertical component of the received seismic waves. Transducer outputs from an array of such single-transducer geophones often are electrically connected in series circuit, with the output from the series-connected transducers being supplied to one data channel of a multiple-channel recording device for recording of the composite signal from the geophone array. Generally, a plurality of geophone arrays are included at different distances from the seismic source to obtain a plurality of seismic records from groups of geophones. By employing arrays of series-connected or series-parallel connected geophones, the geophone response to Rayleigh, or ground roll, waves, which contain no deep-earth information, is substantially cancelled from the composite seismic records. The outputs from, say, thirty-six geophones may be connected together in an effort to eliminate the Rayleigh wave component from the composite signal. Often, up to ninety-six groups, or arrays, of geophones are included in a single set-up. Obvious disadvantages in the use of such prior art arrangements is the need for a large number of geophones, and the time and effort in properly locating and interconnecting the same. U.S. Pat. No. 3,719,924 is illustrative of such prior art method.

Geophones containing three orthogonally oriented transducers are known as shown, for example, in U.S. Pat. No. 3,344,881 which transducers may be positioned to individually respond to vertical, horizontal in-line, and horizontal cross-line components of seismic waves. The three transducer outputs are sent over separate transmission paths, such as a plurality of dual-conductor lines, to a multichannel recorder for recording at separate recording channel. These recorded signals may be played back and processed to suppress Rayleigh wave component response, or the like. Using geophones of this type, fewer geophones are required to cover the same area as are required using the one-transducer geophones. Each geophone is provided with a plurality of transmission paths for connection of the individual transducer outputs to the multi-channel recorder, adding to the cost and complexity of a set-up employing such geophones. Further, processing of the signals requires processing method and means not now readily available. As a result, seismic exploration employing three-transducer geophones is not yet widely practiced.

SUMMARY OF THE INVENTION AND OBJECTS

An object of this invention is the provision of an improved geophone for seismic exploration use which includes means for transmitting two or more signals obtained from a plurality of transducers included in the geophone to a remote location over a single transmission path, or channel, such as a dual-wire transmission line, telemetry channel, or the like.

An object of this invention is the provision of an improved geophone which includes a plurality of transducers with perpendicular axes, and signal processing means for enhancing at least one of the signals prior to transmission to a remote recorder.

The above and other objects and advantages of this invention are achieved by use of a geophone having at least two transducers with axes which are perpendicular to each other, which transducers are responsive to vertical and horizontal components of seismic waves. The geophone may include one or more processing circuits responsive to the transducer outputs for ground roll suppression filtering, signal enhancement, or the like. When more than one geophone signal output is to be recorded, multiplex means are employed for transmission of the geophone outputs over a single transmission path to a remote recorder or the like.

BRIEF DESCRIPTION OF THE DRAWINGS

The invention, together with other objects and advantages thereof, will be better understood from the following description when considered with the accompanying drawings. In the drawings, wherein like reference characters refer to the same parts in the several views:

FIG. 2A is a block diagram showing of a modified form of this invention in which signal transmission by optic fiber means from the geophone to the receiver is shown;

FIG. 9 is a block diagram of another modified form of this invention which is similar to that shown in FIG. 8 but which includes a microcomputer for digital signal processing.

Seismic sources generate many types of seismic waves including pressure (P-waves), shear (S-waves), Love and Rayleigh waves. The Love and Rayleigh, or ground roll, waves comprise surface waves which travel along the near surface of the earth and, consequently, contain no information concerning deep earth formations. P-waves and S-waves travel downwardly into the earth and may be reflected or refracted back to the earth's surface. They, therefore, contain useful information about the deep subsurface. Generally, S-waves are attenuated faster than P-waves and, therefore, produce much weaker signals at the geophones. Using geophones embodying the present invention, the ease with which useful seismic signals are obtained for recording is greatly facilitated.

Figure 1:
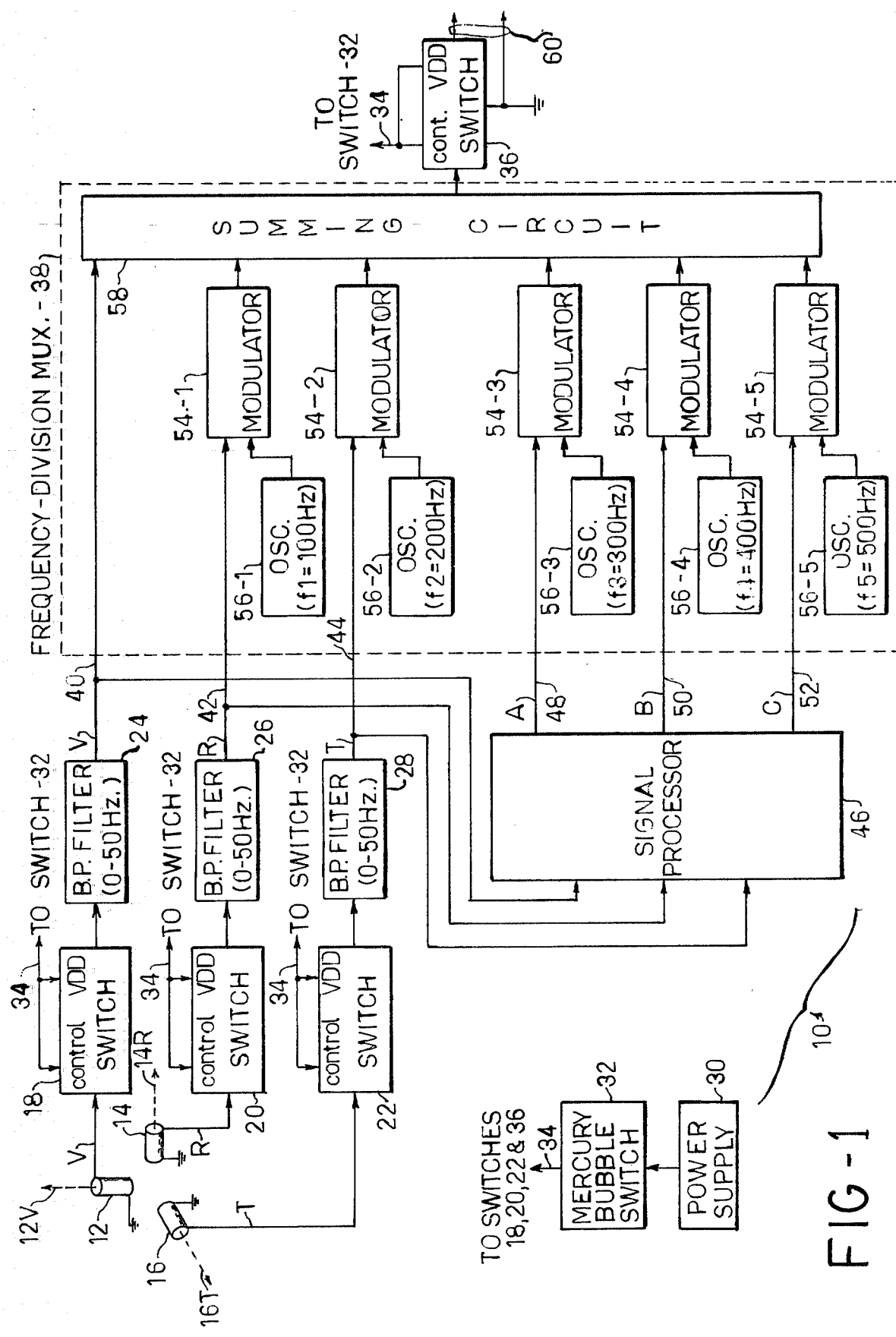
FIG. 1 shows, in block diagram form, a novel multitransducer geophone embodying the present invention.

Reference first is made to FIG. 1 wherein a geophone identified generally by the reference numeral 10 embodying the present invention is shown comprising three orthogonally positioned transducers 12, 14 and 16 which are responsive to seismic waves. Acoustic transducers of this type are well known which are adapted to operate over the useful frequency range of seismic waves between, say 2 and 300 Hz. For present purposes, circuitry for processing waves to a maximum of 50 Hz will be described, although it will be understood that the invention is not limited thereto. The transducers, together with other electronic circuitry shown in FIG. 1, are located in a conventional geophone housing which includes a leveling bubble for proper leveling of the geophone in use. The geophone is coupled to the earth and, when properly leveled, the axis 12V of transducer 12 extends vertically, and the axes 14R and 16T of transducers 14 and 16, respectively, extend horizontally. In use, the axis 14R is directed toward the seismic source, such as a shot point, i.e. radially thereof, and the axis 16T extends transversely thereof. It will be seen then that the suffixes V, R and T refer to orthogonal vertical, radial and transverse axes, respectively.

Output signals designated V, R and T are obtained from the transducers 12, 14 and 16, which signals are connected through electronic switches 18, 20 and 22 to bandpass, or low-pass, filters 24, 26 and 28, respectively. Power and control signals for the switches 18, 20 and 22 are provided by a power supply 30 connected thereto through a level sensing switch, such as mercury bubble switch 32, over line 34. Any suitable power supply may be employed including one or more batteries. The level sensing switch 32 is adapted to close only when the geophone is substantially level and, consequently, there is no current drain from the power supply 30 when the geophone is not substantially level. Also, by disconnection of the transducer outputs from the remainder of circuitry when the geophone is not substantially level, integrated circuits included in the system are protected against inadvertent damage in the event an input is supplied thereto from a transducer when power is disconnected therefrom. For example, while being transported to and from a site to be explored, the geophones often are subjected to large accelerations which could produce damaging inputs to the integrated circuits in the absence of switches 18, 20 and 22. Of course, the switches 18, 20 and 22 themselves must be able to withstand large input signals from the transducers in the absence of power.

It here will be noted that another switch 36, also under control of the output from the power supply 30, is included in the output path from the geophone 10. Consequently, before generating seismic waves, an impedance check may be made of the outputs from each of the geophones included in the array from the remote recording unit location to determine whether or not all of the geophones are level and in operative condition. If a geophone is not level, the switch 36 is open, or turned "off", and this condition is readily detected at the recording unit at the receiving end of the transmission path from the switch. Making of seismic recordings when any of the geophones in the array is not properly leveled is readily avoidable.

Figure 5:
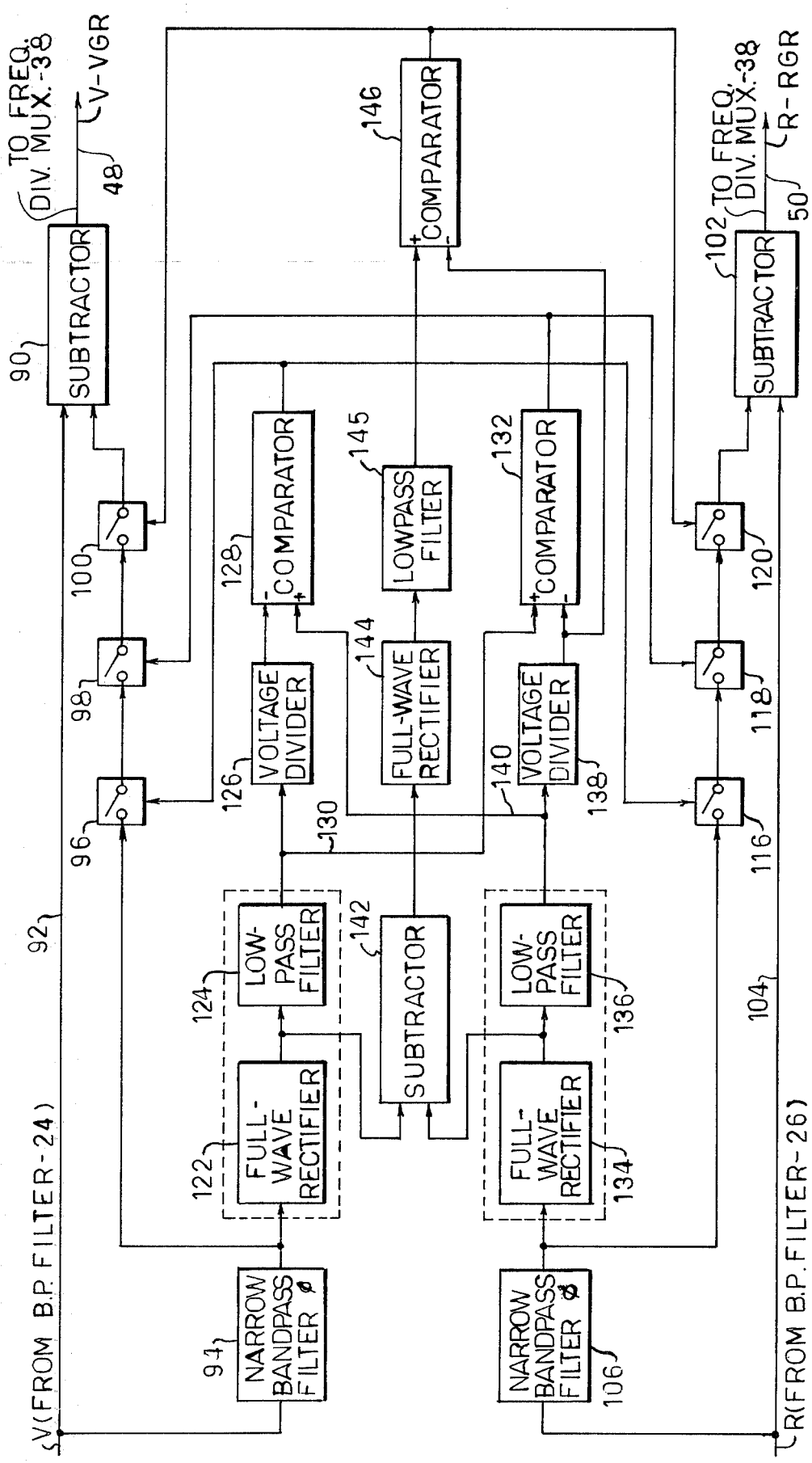
FIG. 5 is a block diagram showing a signal processing circuit of a type which may be included in the geophone shown in FIG. 1.

Useful seismic signals received at the geophones often range in frequency from about 5 to 50 Hz. Vertical components of seismic signals generally fall within this entire range, whereas horizontal components often are limited to the lower one-half thereof. In the drawings, identical filters 24, 26 and 28 for passing signals in the range of 0–50 Hz are shown. The bandpass, or low-pass, filtered V, R and T outputs from the transducers are connected over lines 40, 42 and 44 to a frequency-division multiplex unit 38. In accordance with one feature of the present invention the geophone may include signal processing means, such as signal processor 46 for additional signal processing at the geophone. In FIG. 1, filtered V, T and R outputs from the transducers are shown supplied to the signal processor. For present purposes, the signal processor 46 is shown to include three outputs A, B and C which are connected over lines 48, 50 and 52, respectively, to other inputs of the frequency-division multiplex means 38 for transmission to a remotely located recorder unit together with the V, R and T signals from the bandpass filters. Signal processing at unit 46, when employed, depends upon the use to be made of the signals, physical conditions at the test site, and the like. In FIG. 5, described in detail below, a processing circuit responsive to the V and R signal outputs from the vertical and horizontal in-line transducers 12 and 14 is shown for removal of Rayleigh, or ground roll, signal components therefrom. For present purposes, it will be understood that the geophone may include signal processing means for processing of transducer signal outputs at the geophone, and that one or more processed signals from the processing means may be supplied to the frequency division multiplex unit 38 for transmission to a recording unit along with one or more of the bandpass filtered V, R and T signals from the transducers 12, 14 and 16.

The frequency-division multiplex unit 38, which may be of substantially conventional design, is shown to include a plurality of modulators 54-1, 54-2, 54-3, 54-4 and 54-5 to which the input lines 42, 44, 48, 50 and 52 are connected to provide AM, FM, balanced, or the like, modulating signals to the respective modulators. Carrier signals for the modulators are provided by clocks, or oscillators, 56-1, 56-2, 56-3, 56-4 and 56-5. In the illustrated arrangement, wherein the modulating signals are limited in frequency to no greater than 50 Hz, sinewave oscillators 56-1 through 56-5 operating at, say, 100, 200, 300, 400 and 500 Hz, respectively, may be employed which assures no overlapping in the frequency spectrum of signals from the modulators.

The modulator outputs, together with the unmodulated bandpass filtered V signal output from the vertical transducer 12, are supplied to a summing circuit 58 included in the multiplex unit, the output from which comprises the sum of all of the signal inputs. In the arrangement illustrated in FIG. 1. The summing circuit output is connected through the switch 36 to a dual-conductor transmission line 60 for connection of the geophone output over a single transmission path to a data channel input of a multichannel field recorder, or the like, for recording thereat. Outputs from other geophones included in the array are connected to other channels of the recorder to provide a record of the seismic event.

In the FIG. 1 arrangement, it will be apparent that square or rectangular wave oscillators operating at different rates may be used in place of the illustrated sinewave oscillators 56-1 through 56-5 in which case different oscillator frequency spacings would be required to avoid interference problems with harmonic frequency components generated during modulation. Also, as noted above, band-pass filters having different pass bands may be employed in which case different band spacing may be employed in the frequency-division multiplex unit 38. Frequency-division multiplexing is well known and the selection of proper components and operating frequencies to accommodate the input signals supplied thereto is well within the capabilities of a person skilled in this art. Also, modulation is well known and AM, FM, and the like are within the capabilities of one skilled in the art.

Figure 2:
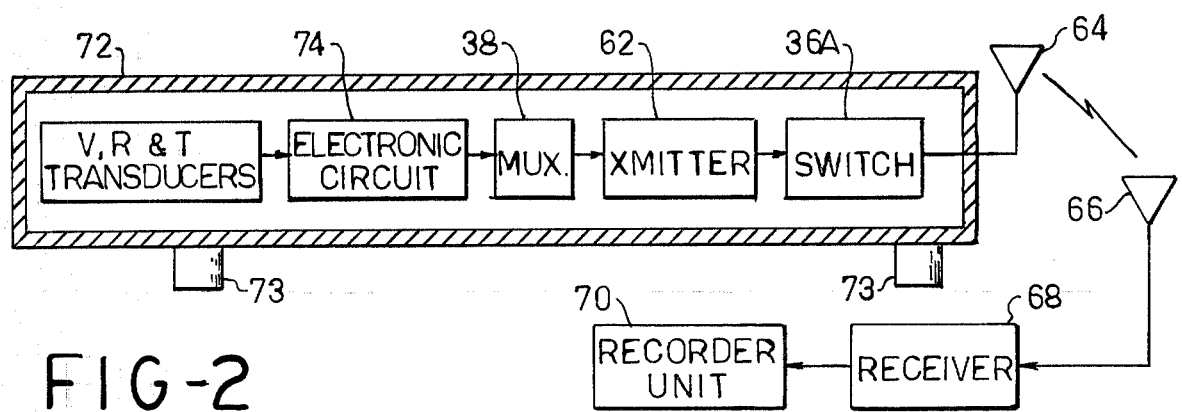
FIG. 2 is a block diagram showing of a modified form of geophone in which multiplexed signals are transmitted to a receiver by radio transmitting means.

In a modified form of this invention shown in FIG. 2, the composite signal from the summing circuit 58 of the frequency-division multiplex unit 38 is supplied as a modulating signal to a transmitter 62. The transmitter output is connected through an output switch 36A, of the same type as switch 36 shown in FIG. 1 and described above, to an antenna 64 for radio transmission of the signal to a receiving antenna 66 of a receiver 68. The receiver output is shown connected to one input channel of a multichannel recorder unit 70. In FIG. 2, the illustrated geophone includes a housing 72 having three legs 73 (two of which are shown) for coupling thereof to the earth. The transmitter 62, switch 36A, frequency-division multiplexer 38 and associated electronic circuitry identified generally by reference numeral 74 are shown contained in the housing. It will be understood that except for radio transmission of the geophone output instead of transmission over a wire-pair, the geophone of FIG. 2 may be of the same general type as geophone 10 shown in FIG. 1 and described above. With the FIG. 2 arrangement, the composite signal from the frequency-division multiplex unit 38 modulates a higher frequency carrier wave at the transmitter 62 for wave transmission to a remote receiver. Each geophone included in a spread is provided with a different frequency transmitter to avoid interference between transmitted signals. A transmitter employing any well known type of modulation such as AM, FM, etc. may be employed as desired. Also, other means, such as fiber optics, may be used to transmit the signal. In FIG. 2A, a geophone which may be of the same general type as shown in FIGS. 1 and 2 is shown except that an optoelectronic transmitter 76 is shown included therein for light transmission of the geophone output over fiber-optic cable, or line, 77 to an optoelectronic receiver 78 having an output connected to the recorder unit 70.

Figure 3:
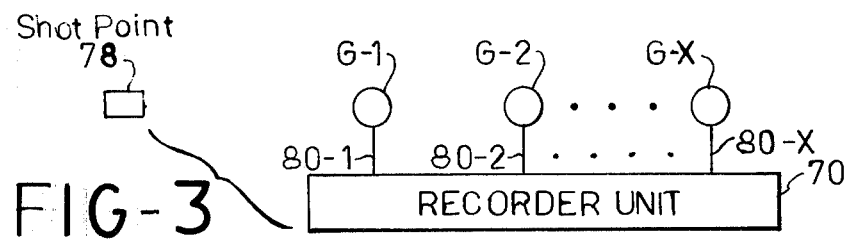
FIG. 3 is a diagram showing an array of geophones embodying this invention connected to a recording unit for recording seismic signals from the individual geophones included in the array.

In FIG. 3, to which reference now is made, a field layout employing geophones G-1, G-2 ... G-x which embody the present invention is shown. Typically, the geophones are spaced, say 10–300 feet apart, as distinguished from prior art single transducer geophone layouts requiring many more geophones at much closer spacing with groups of geophone outputs connected in series circuit, or series-parallel circuit, to suppress Rayleigh wave response of the group. In FIG. 3, a shot point 78 is shown located at one end of the geophone spread at a known distance therefrom. Output signals from the geophones are shown connected by dual-conductor transmission lines 80-1, 80-2 ... 80-x to the inputs of the multichannel recorder 70 for recording thereat. Where geophones of the type shown in FIG. 1 and described above are employed in the arrangement of FIG. 3, it will be apparent that each channel record includes a plurality of information-containing frequency bands. A playback system for recovery of such information is shown in FIG. 4, to which Figure reference now is made.

Figure 4:
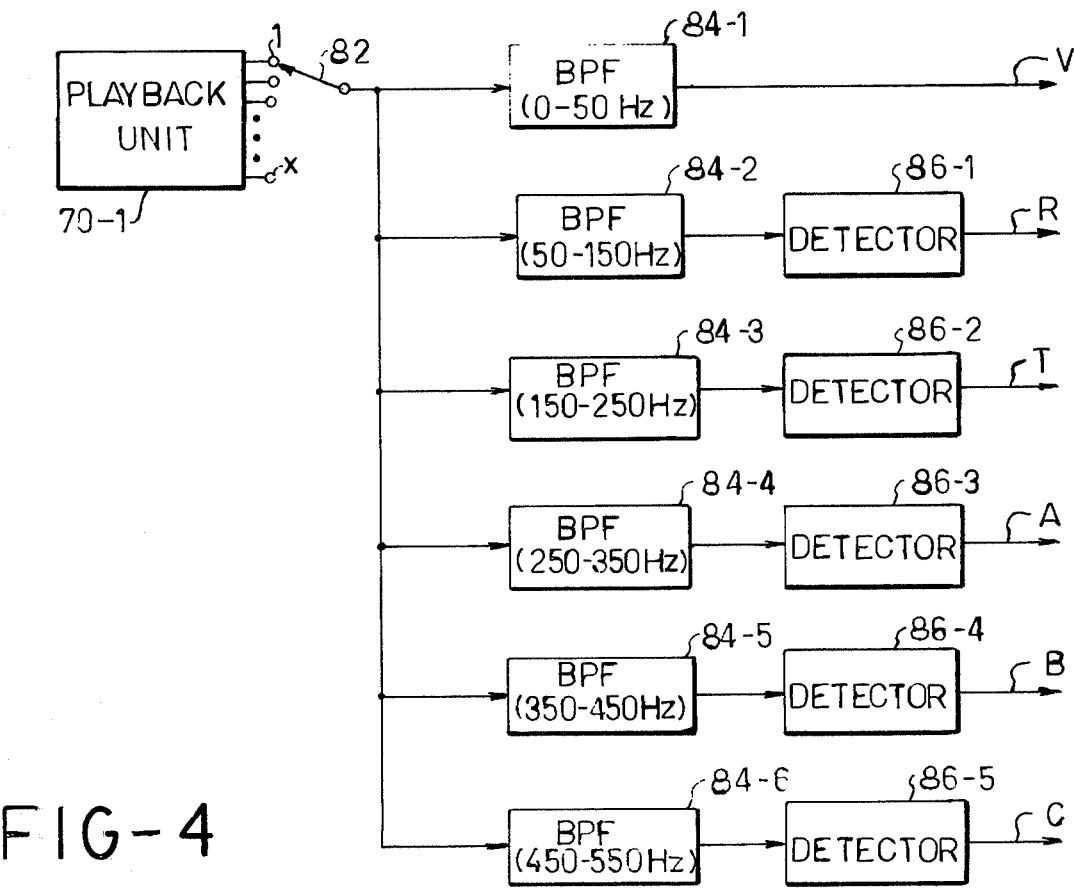
FIG. 4 is a block diagram showing demodular means for demodulation of recorded frequency-division multiplexed signals.

In FIG. 4 a playback unit 70-1 for playing back the recordings made by recorder 70 is shown. Obviously, the recorder 70 and playback unit 70-1 may comprise a unitary recorder/playback unit, if desired. A selector switch 82 connects the output from a selected channel of the playback unit to the inputs of a plurality of bandpass filters 84-1, 84-2, 84-3, 84-4, 84-5 and 84-6. The one filter 84-1 passes the 0–50 Hz signal V obtained from the vertical transducer, whereas filters 84-2 through 84-6 are tuned to pass the modulated carrier waves of modulators 54-1 through 54-5, respectively. For example, envelope detectors 86-1, 86-2, 86-3, 86-4 and 86-5 responsive to the amplitude modulated signals from bandpass filters 84-2, 84-3, 84-4, 84-5 and 84-6, respectively, may be used to demodulate said signals. In the illustrated arrangement, the six signals V, R, T, A, B and C are available at the output from the system for recording and/or further processing by means not shown.

Depending upon the composition of the earth at the geophone spread, the absence of natural surface faults between the seismic source and one or more of the geophones included in the array, etc., Rayleigh or ground roll waves of much greater amplitude than the desired P-waves or S-waves may be received at the geophones. Since response to the large ground roll wave signals is not reduced with the present geophone arrangement, by series-circuit connection, or series-parallel circuit connection, of outputs from groups of geophones, such large ground roll signals could easily saturate the recorder channel amplifiers, thereby resulting in gross distortion of the recorded signals. Ground roll waves couple, primarily, to the vertical and horizontal in-line transducers 12 and 14, respectively, of the geophones. If desired, the signal processor 46 in the geophone may include first and second logarithmic-responsive amplifiers responsive to the bandpass filtered outputs from the respective transducers 12 and 14. The dynamic range-compressed signals from such logarithmic amplifiers are fed to the frequency-division multiplex unit 38 (say, as signals A and B) for transmission to the field recorder over the transmission path associated with the geophone. Now, when recorded signals are subsequently processed, the logarithmically-amplified signals may be used in place of the original V and R signal components when the dynamic range of the recorder is exceeded in recording of said original V and R signal components. With further processing, ground roll wave components may be removed, or suppressed, from the recorded signals by use of suitable suppression circuitry.

Another feature of the present invention involves the use of ground roll signal suppression circuit means at the geophone whereby V, T and/or R signals with ground roll signal components removed therefrom are transmitted to the recorder unit. Although ground roll suppression means are known, for purposes of illustration a signal processing circuit is shown in FIG. 5 which functions to remove ground roll wave components from the V and R outputs from the vertical and horizontal in-line transducers 12 and 14, respectively. Referring to FIG. 5, the vertical signal V from the bandpass filter 24 is shown connected to one input of a subtractor circuit 90 over line 92. The bandpass filtered signal also is connected through a narrow bandpass filter 94 and switches 96, 98 and 100 to the other input of the subtractor circuit 90. As is well understood, ground roll waves have a dominant frequency component dependent upon the composition of the near surface earth, which frequency generally lies in the range between 5–15 Hz. In practice, the ground roll frequency at the exploration site is determined, by testing, and the variable frequency narrow band filter 94 is tuned to such frequency. Circuit means, described below, detects the presence of ground roll signals in the received V and R signals, and functions to close the switches 96, 98 and 100 during the presence. When all three switches 96, 98 and 100 are closed, i.e. turned "on", the ground roll wave component of the V signal is connected to the subtractor 90 input for subtraction thereof from the vertical signal V. In FIG. 5, the output from the subtractor circuit is identified as V-VGR.

For suppression of ground roll signal components from the horizontal in-line R signal, the R signal is connected to one input of a subtractor 102 over line 104. The R signal also is connected to the input of a narrow bandpass filter 106 tuned to the same dominant ground roll frequency as the narrow bandpass filter 94. The output from the filter 106 is connected to the other input of the subtractor 102 through electronic switches 116, 118 and 120, respectively. Since the switches are closed only during the presence of ground roll, it will be apparent that the ground roll wave component of the R signal is suppressed from the horizontal in-line signal R at the output from the subtractor 102, which output is identified as R-RGR in FIG. 5.

Circuitry for detecting the presence of ground roll now will be described. As is well understood, ground roll waves couple substantially equally to the vertical and horizontal inline transducers to produce substantially equal ground roll signal components therefrom. Also, as is well understood, these ground roll signal components are substantially ±90° out of phase phase. In the illustrated circuit arrangement, switches 96 and 116 are closed, i.e. turned "on", when components of the V and R signals from the narrow bandpass filters 94 and 106 satisfy the relationship that $R \geq V/N1$, and switches 98 and 118 are closed when $V \geq R/N2$, where N1 and N2 are values greater than 1. For example, N1 and N2 may be equal and in the following description are assumed to have a value of 2. Switches 100 and 120 are closed when the V and R signals from the narrow bandpass filters 94 and 106, respectively, are substantially ±90° in phase. Circuitry for operating the switches in such a manner now will be described.

As seen in FIG. 5, the output from the narrow bandpass filter 94 is supplied to a full wave rectifier 122 for full wave rectification of the narrowband, possible ground roll, component of the V signal. A low-pass filter 124 filters the output from the rectifier for envelope detection of the narrow band signal component. The low-pass filter output is connected through a voltage divider 126 to a first comparator 128. The filter 124 output also is directly connected over line 130 to a second comparator 132.

The narrowband, possible ground roll, component of the R signal from narrow bandpass filter 106 is processed in a similar manner for supplying second signal inputs to the comparators 128 and 132. In particular, the filter 106 output is connected to the input of an envelope detector comprising a full wave rectifier 134 and low-pass filter 136. The envelope-detected signal from filter 136 is connected to the comparator 132 through a voltage divider 138, and is directly connected over line 140 to the first comparator 128. The voltage dividers 126 and 138 have outputs which are "tuned" to the area and may be substantially equal to one-half the narrowband V and R signal components, respectively, supplied thereto. It will be seen, then, that the comparator 128 is supplied with the narrow band signal components V/2 and R, whereas the comparator 132 is supplied with the narrow band signal components V and R/2. The output from the comparator 128 is connected to switches 96 and 116 for "on"/"off" control thereof, and the output from the comparator 132 is connected to switches 98 and 118 for "on"/"off" control of these switches. If $R \geq V/2$, the output from the comparator 128 is of such a polarity to close switches 96 and 116, and if $V \geq R/2$, the output from the comparator 132 is of such a polarity to close switches 98 and 118. It will be seen, then, that the ground roll suppression circuit described thus far serves to check whether or not the condition $R/2 \leq V \leq 2R$ is satisfied and, if so, to close switches 96, 98, 116 and 118.

As noted above, the switches 100 and 120 are closed whenever the narrow band signal components from filters 94 and 106 are substantially ±90° out of phase phase. A phase test is provided by supplying the full wave rectified signal outputs from the rectifiers 122 and 134 to a subtraction circuit 142 having an output equal to the voltage at the one (noninverting) input, less the voltage at the other (inverting) input. Thus, if the inputs to the subtraction circuit are equal in magnitude and 0° in phase, the output from the subtraction circuit is zero. On the other hand, equal magnitude input signals which are ±90° out of phase phase result in a large output from the subtractor. The subtractor output is rectified by full wave rectifier 144, and the rectified output is filtered by low pass filter 145, the output from which is supplied to one input of a comparator 146. A reference signal for the comparator 146 may be supplied thereto from the output of either of the voltage dividers 126 or 138, or from a separate source, not shown, with the actual valve thereof being selected on the conditions at the area. That is, tests at the site are conducted to first determine the relative phase and magnitude of the ground roll components included in the V and R signals, and the comparator reference signal is set accordingly. For purposes of illustration, the output from the voltage divider 138 is shown connected to the comparator as a reference signal.

The output from the comparator 146 is supplied as switch control signals to switches 100 and 120. If the output from filter 145 exceeds the output from the voltage divider 138, the comparator output functions to close, i.e. turn "on" the switches 100 and 120. Otherwise, the switches remain open. When switches 96, 98 and 100, and switches 116, 118 and 120 are turned "on", the ground roll components of the V and R signals from narrow bandpass filters 94 and 106 are subtracted from the V and R signals. Delay circuits, now shown, may be included in the lines 92 and 104 to the subtractors 90 and 102, respectively, for proper phasing of the signal inputs to the subtractors. The V-VGR and R-RGR signals from the subtractors 90 and 102 are connected to the frequency-division multiplexer 38 for transmission to the field recorder along the with other geophone signal outputs.

As is well understood, ground roll, or Rayleigh wave, signals generally are not directly coupled to the horizontal transverse transducer 16. However, reflected ground roll signals may be coupled thereto, as well as ground roll signals resulting from traffic or other "cultural" noise, and it may be desired to remove the same from the T signals. To this end, another narrow bandpass filter tuned to the same frequency as filters 94 and 106 may be included, to which the T signal from transducer 16 is coupled. The narrow band output of such filter may be connected through three switches to a subtractor, with the T signal being supplied as a second input to the subtractor. The three switches would be controlled by outputs from the three comparators 128, 132 and 146, in the same manner as switches 96, 98 and 100 and switches 116, 118 and 120 whereby any ground roll signal components present in the T signal would be subtracted therefrom.

Figure 6:
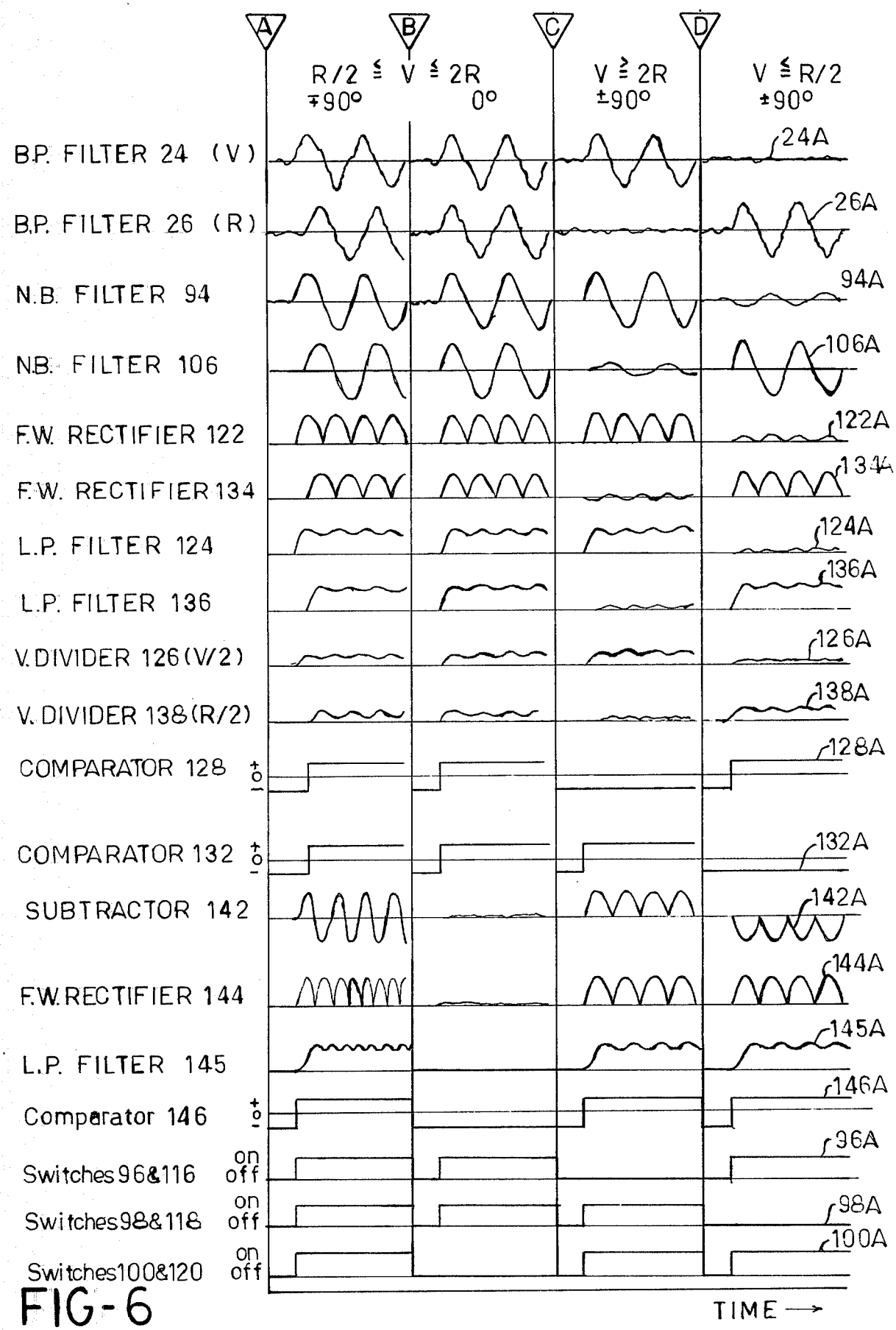
FIG. 6 is a graph showing waveforms appearing at different points for use in explaining operation of the system shown in FIGS. 1 and 5.

Although the operation of the novel geophone of this invention is believed to be apparent from the above-description, a brief description of the operation with reference to the waveforms shown in FIG. 6 now will be given. In FIG. 6, the waveforms illustrate the following operation conditions; (A) $R/2 \leq V \leq 2R$ and $\pm 90°$ phase, (B) $R/2 \leq V \leq 2R$ and $0°$ phase, (C) $V \geq 2R$ and $\pm 90°$ phase, and (D) $R/2 \geq V$ and $\pm 90°$ phase.

Referring first to the group (A) waveforms, the waveforms 24A and 26A identify filtered transducer outputs from the bandpass filters 24 and 26, respectively, (the output T from the horizontal transverse transducer 16 not being shown in FIG. 6). Frequency components of the V and R signals within the pass bands of the narrow band filters 94 and 106 which pass through the filters are identified by reference characters 94A and 106A, respectively. These signal components, which may or may not have been produced by ground roll waves, are supplied to the full wave rectifiers 122 and 134, and the rectifier outputs 122A and 134A are filtered by low pass filters 124 and 136 having outputs 124A and 136A comprising envelopes of the narrow bandpass filter outputs 94A and 106A. The low-pass filter outputs 124A and 136A are reduced in voltage by voltage dividers 126 and 138, and the reduced voltage outputs 126A and 138A are supplied to inputs of comparators 128 and 132, respectively. Outputs 124A and 136A from the filters 124 and 136 are supplied as second inputs to the comparators 132 and 128, respectively. If the input 136A to the comparator 128 is equal to or greater than the input 126A thereto from the voltage divider 126, the comparator output is positive; and, if it is smaller, the comparator output is negative. At the group (A) waveforms, the comparator output 128A is positive when the input 136A exceeds the input 126A. As a result, switches 96 and 116 are closed, or turned "on", as indicated by waveform 96A. Similarly, the output 132A from the comparator 132 is positive if the input 124A is equal to or greater than the input 138A thereto. At the group (A) waveforms, the comparator output 132A also goes positive for closure of switches 98 and 118, as indicated by waveform 98A. Thus, with the illustrated group (A) V and R signals, the conditions that $R/2 \leq V \leq 2R$ are satisfied for closure of switches 96 and 98, and switches 116 and 118.

The phase relationship of the narrow band components 94A and 106A of the V and R signals is checked by application of the full wave rectifier outputs 122A and 134A to the subtractor 142. With a $\pm 90°$ phase relationship between these V and R signal components, as illustrated in the group (A) waveforms, the subtractor output 142A comprises a large alternating current signal which is rectified by rectifier 144. The rectifier output 144A is filtered by low pass filter 145, and the low pass filter output 145A is supplied as one input to the comparator 146, and a second comparator input is provided by the output 138A from the voltage divider 138. When the rectified and filtered subtractor output 145A exceeds the output 138A from voltage divider 138, the comparator output 146A is positive for closure of switches 100 and 120 as shown at waveform 100A. With all of the switches 96, 98 and 100, and 116, 118 and 120 closed, the ground roll components of the V and R signals are supplied to the subtractors 90 and 102 for subtraction from the V and R signals. As described above, the subtractor outputs V-VGR and R-RGR are supplied to the frequency-division multiplex means 38 for transmission from the geophone to a remote location over a single transmission path.

Reference now is made to the group (B) waveforms of FIG. 6 showing operation of the ground roll wave suppression circuit in response to substantially equal magnitude narrow band components of the V and R signals which are at 0° phase relationship. It will be seen that switches 96 and 116, and switches 98 and 118 (see waveforms 96A and 98A) are closed in response to positive outputs 128A and 132A from the comparators 128 and 132, respectively. The comparator output 146A, however, remains low whereby switches 100 and 120 (waveform 100A) remain open, or "off". In this case, the subtractor output 142A remains low since the inputs 122A and 134A from full wave rectifiers 122 and 134, respectively, are of equal magnitude and 0° phase relationship. With a low subtractor output 142A, the full wave rectifier output 144A and low pass filter output 145A also are low, and the comparator output 146A remains negative. With switches 100 and 120 open, the outputs from the subtractors 90 and 102 simply comprise the respective V and R signals 24A and 26A obtained from bandpass filters 24 and 26. It here will be noted that with the V and R signals which are 180° out of phase, the full wave rectifier outputs 122A and 134A are the same as shown at (B) of the waveforms, whereby the switches 100 and 120 would remain open under such conditions.

In the group (C) waveforms of FIG. 6, the R output 26A from bandpass filter 26 is much smaller than the V output 24A, and the narrowband filter output 106A is much smaller than the output 94A from the narrow band filter 94. In this situation, the relationship $R \geq V/2$ is not satisfied, whereby the comparator output 128A is negative and the switches 96 and 116 remain open, or "off".

In the group (D) waveforms, the V output 24A is much smaller than the R output 26A, and the narrow band filter output 94A is much smaller than the output 106A from the narrow band filter 106. Under these conditions, the relationship $V \geq R/2$ is not satisfied, and the output 132A of the comparator 132 is low whereby the switches 98 and 118 remain open, or "off".

Figure 7:
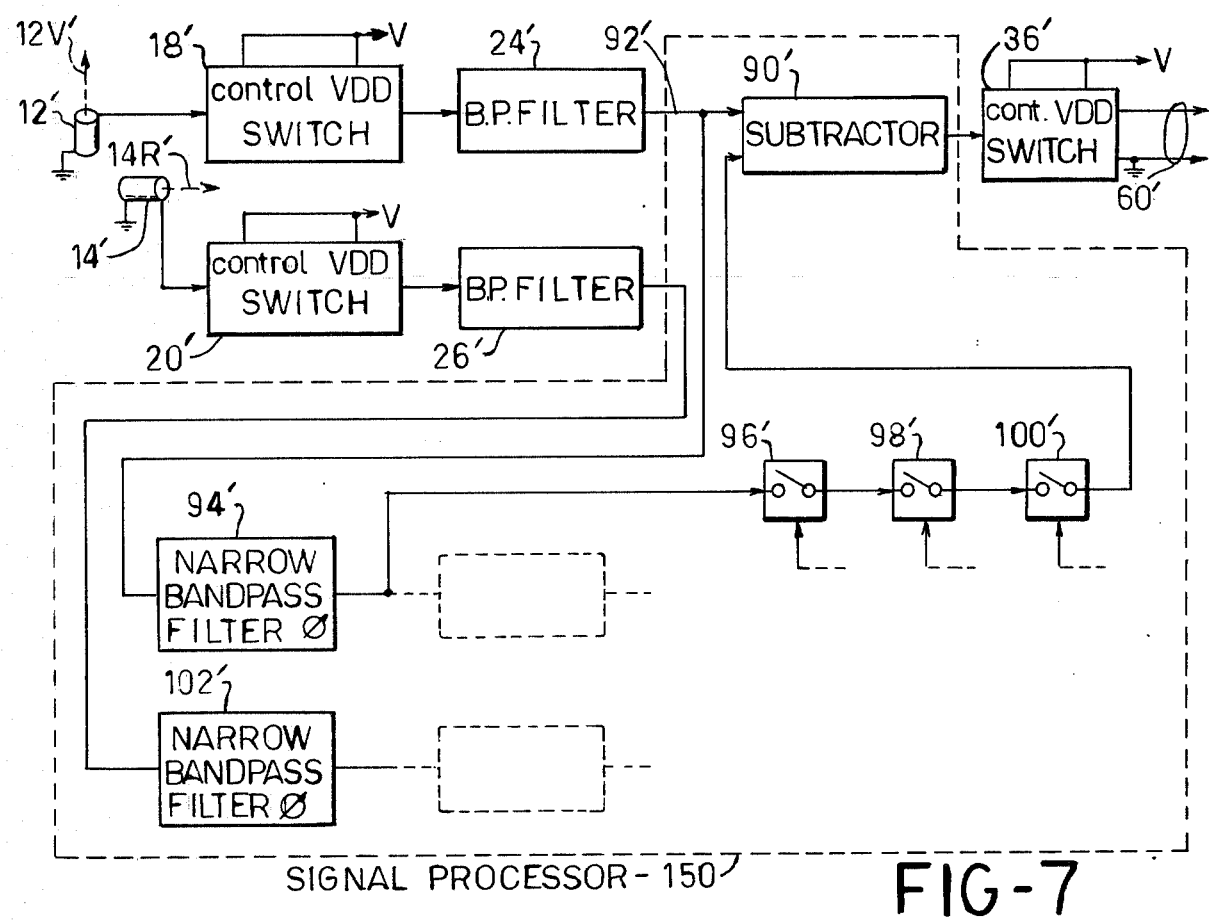
FIG. 7 is a block diagram showing a modified form of this invention in which a single enhanced signal is transmitted from each geophone for individual recording thereof at a remote location.

Reference now is made to FIG. 7 wherein a modified form of this invention is shown in which the geophone includes two transducer elements 12' and 14' having perpendicular axes 12V' and 14R', respectively. In use, the geophone is oriented such that the transducer axis 12V' extends vertically, and the transducer axis 14R' extends horizontally in the direction of the seismic source. The geophone of FIG. 7 is made up, essentially, of many of the same components included in the FIGS. 1 and 5 arrangement described above. For purposes of description, reference numerals identifying corresponding parts are primed in the FIG. 7 arrangement. Thus, transducers 12' and 14' shown in FIG. 7 correspond to the vertical and horizontal in-line transducers 12 and 14 shown in FIG. 1.

The V and R signals from the transducers 12' and 14' pass through switches 18' and 20' and thence through bandpass filters 24' and 26', respectively. The V signal output from filter 24' is coupled over line 92' to one input of the subtractor 90' included in a signal processor designated 150. The filter 24' output also is supplied to the narrow band filter 94' of the processor, which filter is tuned to the dominant ground roll frequency at the test site. The processor 150 is of the same type as the processor shown in FIG. 5 and described above except that no provision is made for the suppression of the ground roll component of the horizontal in-line signal R from the transducer 14'. Instead, the processor 150 simply serves to suppress the ground roll component of the V signal. Only a fragmentary portion of the signal processor 150 is shown in FIG. 7, and no detailed description thereof here is required. It will be sufficient to note that when ground roll signal components are sensed, the switches 96', 98' and 100' all are closed, i.e. turned "on", for connection of the output from the narrow band filter 94' to the subtractor 90' for ground roll suppression. The subtractor output is shown connected through output electronic switch 36' to a dual-wire transmission line 60' for transmission to a remote location.

With the FIG. 7 arrangement, only a single output signal is provided whereby no multiplexer is required for transmission of the signal to a remote location. Since the ground roll component is removed from the vertical transducer 12' output before transmission, there is no need to connect the geophone output in effective series circuit, or series-parallel circuit, with outputs from a plurality of adjacent geophones in order to remove or suppress ground roll from the composite signal.

Figure 8:
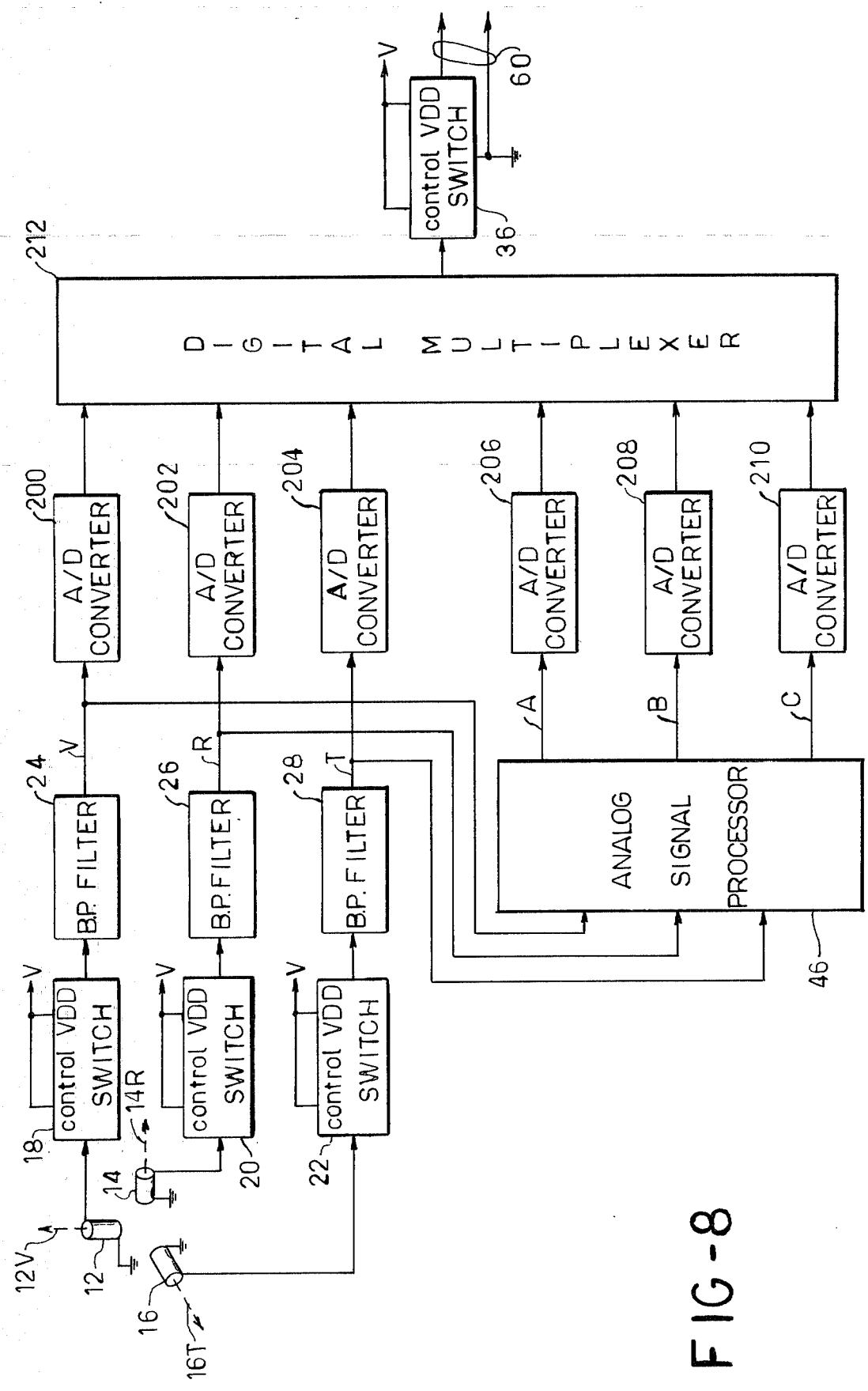
FIG. 8 is a block diagram of a modified form of this invention which is similar to that shown in FIG. 1 but employing a combination of analog and digital signal processing.

As will be readily apparent to those skilled in this art, digital techniques may be employed in geophones embodying this invention. Reference now is made to FIG. 8 wherein another modified form of this invention is shown which is similar to the geophone of FIG. 1 except that the analog V, R and T signals from the bandpass filters 24, 26 and 28, respectively, and the analog A, B and C signals from the analog signal processor 46 are converted to digital form for digital transmission thereof over the transmission line 60. In FIG. 8, the same reference characters employed in FIG. 1 are used to identify corresponding parts. There, the vertical, radial and transverse signals V, R and T, from the respective bandpass filters 24, 26 and 28 are supplied as inputs to analog-to-digital converters 200, 202 and 204 for conversion to digital form. Similarly, the A, B and C signals from the analog signal processor 46 are supplied as inputs to analog-to-digital converters 206, 208 and 210, respectively, for conversion to digital form. A digital multiplexer 212 sequentially connects the digitized V, R, T, A, B and C signals to the switch 36 for connection of the signals to the transmission line 60 when the switch 36 is turned "on". As with the arrangement of FIG. 1, a single dual wire transmission line 60 functions to connect a plurality of multiplexed signals to remote recording apparatus, not shown.

In the FIG. 9 embodiment, to which figure reference now is made, a microcomputer is included in the geophone for signal processing purposes. As in the arrangement shown in FIG. 8, the V, R and T signals are converted to digital form by analog-to-digital converters 200, 202 and 204, and the digitized signals are supplied to the multiplexer 212. In the FIG. 9 arrangement, the output from the digital multiplexer is supplied to a microcomputer 214, which computer may be programmed to perform the same signal processing which is performed by the analog signal processor 46. For example, ground roll suppression, such as provided by the unit shown in FIG. 5 and described above, may be implemented digitally in the microcomputer 214. The desired output signal, or signals from the computer are connected to the switch 36 through parallel to serial interface 216 for transmission to a remote recorder over transmission line 60. Digital processing allows for great flexibility in the system design. For example, removable plug-in read only memories (ROMs) may be included for operation as required at the test site. The use of digital polorization filtering means is possible and well within the capabilities of one skilled in this art. Clearly, the illustrated analog processor is only one of many ground roll suppression methods which may be employed in the geophone of this invention.

The invention having been described in detail in accordance with requirements of the Patent Statutes, various other changes and modifications will suggest themselves to those skilled in this art, which changes and modifications are intended to fall within the scope of the invention as identified in the appended claims.

I claim:

1. In a seismic system, the combination comprising, at least one geophone for sensing seismic waves generated by a seismic energy source a spaced distance from the geophone, said geophone including,
   at least two motion-sensing transducers having electrical signal outputs which include ground roll signal components, the axes of which transducers are perpendicular for detecting perpendicular components of incoming seismic waves in the directions of said axes,
   signal processing means including active circuit elements at said geophone responsive to output signals from at least said two motion sensing transducers for suppressing ground roll signal components from at least one of the transducer output signals,
remote receiver means, and
means for connecting the output from said signal processing means at said geophone to said remote receiver means.

2. In a seismic system, the combination comprising, at least one geophone for sensing seismic waves generated by a seismic energy source a spaced distance from the geophone, said geophone including,
   at least two motion-sensing transducers having electrical signal outputs which include ground roll signal components, the axes of which transducers are perpendicular for detecting perpendicular components of incoming seismic waves in the directions of said axes,
   signal processing means at said geophone responsive to output signals from at least said two motion sensing transducers for suppressing ground roll signal components from at least one of the transducer output signals,
remote receiver means, and
means for connecting the output from said signal processing means at said geophone to said remote receiver means, said connecting means including a multiplexer at said geophone for also connecting input signals which are supplied to said signal processing means to said remote receiver means.

3. In a seismic system as defined in claim 2 including means for converting the transducer output signals and the output from said signal processing means to digital form, and said multiplexer comprises a digital multiplexer to which the digitized transducer outputs and signal processing means output are connected.

4. In a seismic system as defined in claim 2 wherein said multiplexer comprises frequency-division multiplex means producing a plurality of carrier signals of different frequencies which are modulated by input signals to, and the output from, said signal processing means.

5. In a seismic system, the combination comprising,
at least one geophone for sensing seismic waves generated by a seismic energy source a spaced distance from the geophone, said geophone including,
at least two motion-sensing transducers having electrical signal outputs which include ground roll signal components, the axes of which transducers are perpendicular for detecting perpendicular components of incoming seismic waves in the directions of said axes,
signal processing means at said geophone responsive to output signals from at least said two motion sensing transducers for suppressing ground roll signal components from at least one of the transducer output signals,
remote receiver means,
means for connecting the output from said signal processing means at said geophone to said remote receiver means,
electronic switching means at said geophone for connecting the transducer output signals to said signal processing means, and
means including level responsive switching means at said geophone for on-off control of said electronic switching means for connecting the transducer output signals to said signal processing means only when the geophone is substantially level.

6. In a seismic system as defined in claim 2 including electronic switching means at the geophone for connecting the output from said multiplexer to said remote receiver means, and
means including level responsive switching means for control of said electronic switching means for connecting the output from said multiplexer through said electronic switching means to said remote receiver means only when the geophone is substantially level.

7. In a seismic system as defined in claim 6 including electronic switching means at said geophone for connecting the transducer output signals to said signal processing means, and wherein
said switching means also are under control of said level responsive switching means for connecting the output signals from the transducers to said signal processing means only when the geophone is substantially level.

8. In a seismic system, the combination comprising,
a geophone for sensing and processing seismic waves generated by a seismic energy source a spaced distance from the geophone, said geophone including
at least two motion-sensing transducers mounted along perpendicular axes for detecting vertical and horizontal in-line components of incoming seismic waves at the geophone and having V and R output signals, respectively, in proportion thereto,
means including active circuit elements at the geophone responsive to the V and R output signals from said transducers for suppressing ground roll signal components from the V output signal,
remote receiving means, and
means for connecting the output from said ground roll suppressing means at said geophone to said remote receiving means.

9. In a seismic system, the combination comprising,
a geophone for sensing and processing seismic waves generated by a seismic energy source a spaced distance from the geophone, said geophone including,
at least two motion-sensing transducers mounted along perpendicular axes for detecting vertical and horizontal in-line components of incoming seismic waves at the geophone and having V and R output signals, respectively, in proportion thereto,
means at the geophone responsive to the V and R output signals from said transducers for suppressing ground roll signal components from the V output signal,
remote receiving means, and
means for connecting the output from said ground roll suppressing means at said geophone to said remote receiving means,
said connecting means including frequency-division multiplex means as at said geophone to which the V output signal and the output from said ground roll suppressing means are connected for simultaneous transmission thereof to said remote receiving means over a single transmission path.

10. In a seismic system, the combination comprising,
a geophone for sensing and processing seismic waves generated by a seismic energy source a spaced distance from the geophone, said geophone including,
at least two motion-sensing transducers mounted along perpendicular axes for detecting vertical and horizontal in-line components of incoming seismic waves at the geophone and having V and R output signals, respectively, in proportion thereto,
means at the geophone responsive to the V and R output signals from said transducers for suppressing ground roll signal components from the V output signal,
remote receiving means, and
means for connecting the output from said ground roll suppressing means at said geophone to said remote receiving means,
said ground roll suppressing means including,
a subtractor having a pair of inputs,
means for connecting the V output signal to one subtractor input,
first, second and third switching means,
a narrow band filter tuned to the dominant ground roll frequency connecting the V output signal to the other subtractor input through said first, second and third switching means in series circuit,
means for closing the first switch when R is substantially equal to or greater than $V/N_1$, wherein $N_1$ is a value greater than 1, means for closing the second switch when V is substantially equal to or greater than R/N2, wherein N2 is a value greater than 1, means for closing the third switch when V and R are substantially ±90° in phase, the output signal from the narrow band filter being subtracted from the V output signal at said subtractor for suppression of the ground roll signal therefrom whenever said first, second and third switches are closed.

11. In a method of seismic exploration in which seismic waves are generated at a point at the earth's surface and received at a plurality of geophones at spaced distance from the seismic source, said method including, generating separate V and R component signals at each of the geophones in response to vertical and horizontal in-line seismic wave motion of the geophone, using active circuit elements at each of the geophones, suppressing ground roll wave signal components from the V component signals generated at the geophone to produce at each of the geophones ground roll suppressed V component signals, and transmitting said ground roll suppressed V component signals from each geophone for individual recording thereof at a central location.

12. In a method of seismic exploration in which seismic waves are generated at a point at the earth's surface and received at a plurality of geophones at spaced distances from the seismic source, said method including, generating separate V and R component signals at each of the geophones in response to vertical and horizontal in-line seismic wave motion of the geophone, at each of the geophones, suppressing ground roll wave signal components from the V component signals generated at the geophone to produce at each of the geophones ground roll suppressed V component signals, transmitting said ground roll suppressed V component signals from each geophone for individual recording thereof at a central location, and simultaneously transmitting V component signals with said ground roll suppressed V component signals from each geophone for simultaneous recording thereof at the central location.

13. In a method of seismic exploration as defined in claim 12 including frequency division multiplexing of said V component and ground roll suppressed V component signals for simultaneous transmission thereof from each geophone.

14. In a geophone for use in a seismic system for sensing seismic waves generated by a seismic energy source a spaced distance from the geophone, the combination including, at least one motion-sensing transducer at the geophone for generating an electrical signal in response to seismic wave motion of the geophone, electronic circuit means at said geophone having an input and output, the input being responsive to the electrical signal from said transducer, electronic switching means having an input connected to the output from said electronic circuit means, said electronic switching means having an output adapted for connection to a remote location over a transmission path, means at said geophone including level responsive switching means for control of said electronic switching means for connection of the output of said electronic circuit means to the remote location over the transmission path when the geophone is substantially level and for disconnection of the output of said electronic circuit means from the remote location when the geophone is not substantially level, there being a difference in the output impedance of said electronic switching means between the open and closed condition thereof which is detectable from the remote location over the transmission path to provide an indication of level and non-level conditions of the geophone.

15. In a geophone as defined in claim 14 including, second electronic switching means for connecting the output from said motion-sensing transducer to the input of said electronic circuit means, said second electronic switching means also being under control of said level responsive switching means for connecting the electrical signal from said transducer to said electronic circuit means only when the geophone is substantially level.

16. In a geophone for use in a seismic system for sensing seismic waves generated by a seismic energy source a spaced distance from the geophone, the combination including, at least one motion-sensing transducer at the geophone for generating an electrical signal in response to seismic wave motion of the geophone, electronic circuit means at said geophone having an input and having an output adapted for connection to a remote location over a transmission path, electronic switching means operable between closed and open conditions for connecting the transducer electrical signal output to the input of said electronic circuit means in the closed condition thereof and for disconnecting the transducer electrical signal output from the electronic circuit means in the open condition thereof, and means at said geophone including level responsive switching means for control of said electronic switching means to close said electronic switching means when the geophone is substantially level and to open said electronic switching means when the geophone is not substantially level.

* * * * *